(12) United States Patent
Chen et al.

(10) Patent No.: US 11,777,164 B2
(45) Date of Patent: Oct. 3, 2023

(54) COVER PLATE ASSEMBLY, BATTERY, ELECTRICITY-CONSUMING APPARATUS AND METHOD FOR SEALING THROUGH HOLE

(71) Applicant: JIANGSU CONTEMPORARY AMPEREX TECHNOLOGY LIMITED, Liyang (CN)

(72) Inventors: Xinxiang Chen, Liyang (CN); Peng Wang, Liyang (CN); Yulian Zheng, Liyang (CN); Xiaolong Dong, Liyang (CN); Chengdu Liang, Liyang (CN); Wei Li, Liyang (CN)

(73) Assignee: Jiangsu Contemporary Amperex Technology Limited, Liyang (CN)

( * ) Notice: Subject to any disclaimer, the term of this patent is extended or adjusted under 35 U.S.C. 154(b) by 0 days.

(21) Appl. No.: 17/863,650

(22) Filed: Jul. 13, 2022

(65) Prior Publication Data
US 2022/0352583 A1 Nov. 3, 2022

Related U.S. Application Data

(63) Continuation of application No. PCT/CN2021/091735, filed on Apr. 30, 2021.

(30) Foreign Application Priority Data

Jun. 29, 2020 (CN) .......................... 202010604256.9

(51) Int. Cl.
*H01M 50/184* (2021.01)
*H01M 50/636* (2021.01)
*H01M 50/148* (2021.01)
*H01M 50/645* (2021.01)

(52) U.S. Cl.
CPC ....... *H01M 50/184* (2021.01); *H01M 50/148* (2021.01); *H01M 50/636* (2021.01); *H01M 50/645* (2021.01); *H01M 2220/20* (2013.01)

(58) Field of Classification Search
CPC ............ H01M 50/184; H01M 50/148; H01M 50/636; H01M 50/645; H01M 2220/20;
(Continued)

(56) References Cited

U.S. PATENT DOCUMENTS

2002/0076604 A1* 6/2002 Matsuoka ........... H01M 50/249
429/81
2003/0059278 A1* 3/2003 Kochiya ................ F16B 19/08
411/508
(Continued)

FOREIGN PATENT DOCUMENTS

CN 101379305 A 3/2009
CN 101796311 A 8/2010
(Continued)

OTHER PUBLICATIONS

Machine translation of CN 101379305 A (Frank) (Year: 2009).*
(Continued)

*Primary Examiner* — Kwang Han
(74) *Attorney, Agent, or Firm* — Haverstock & Owens, A Law Corporation

(57) ABSTRACT

Embodiments of the present application provide a sleeve assembly, a cover plate assembly, a battery, and an electricity-consuming apparatus. The sleeve assembly is used for sealing a through hole. The sleeve assembly includes: a sleeve with an opening on at least one end; a nail body including a body portion. The size of the body portion is larger than the size of the barrel diameter of the sleeve. The body portion is configured to be inserted into the sleeve through the opening and press the inner wall of the sleeve after the sleeve is inserted into the through hole in the axial direction so as to form a protrusion for riveting the sleeve to the through hole on the outer wall of the sleeve.

14 Claims, 13 Drawing Sheets

(58) Field of Classification Search
CPC .... H01M 50/15; H01M 50/183; H01M 50/24; H01M 10/058; H01M 10/6554; H01M 50/271; Y02E 60/10
See application file for complete search history.

(56) References Cited

U.S. PATENT DOCUMENTS

2007/0117011 A1\* 5/2007 Myerberg ........... H01M 50/152
428/615
2010/0304214 A1 12/2010 Itoh et al.
2014/0295259 A1\* 10/2014 Nakayama ............. B21J 15/043
429/185

FOREIGN PATENT DOCUMENTS

| CN | 202042559 U | 11/2011 |
| CN | 103180619 A | 6/2013 |
| CN | 103814457 A | 5/2014 |
| CN | 104781952 A | 7/2015 |
| CN | 106450070 A | 2/2017 |
| CN | 207818649 U | 9/2018 |
| CN | 106450070 B | 2/2019 |
| CN | 210372520 U | 4/2020 |
| CN | 111490192 A | 8/2020 |
| DE | 102012112578 A | 6/2014 |
| TW | 201430226 A | 8/2014 |

OTHER PUBLICATIONS

"International Search Report" for International application No. PCT/CN2021/091735, dated Jun. 29, 2021, 14 pages.
"First Office Action" for Chinese application No. 202010604256.9, dated Aug. 10, 2020, 14 pages.
"Notification to Grant Patent Right for Invention" for Chinese application No. 202010604256 9, dated Aug. 24, 2020, 6 pages.

\* cited by examiner

COVER PLATE ASSEMBLY, BATTERY, ELECTRICITY-CONSUMING APPARATUS AND METHOD FOR SEALING THROUGH HOLE

CROSS-REFERENCE OF RELATED APPLICATIONS

The present application is a continuation of International Application No. PCT/CN2021/091735, filed on Apr. 30, 2021, which claims priority to Chinese Patent Application No. 202010604256.9, filed on Jun. 29, 2020, both of which are hereby incorporated by reference in their entireties.

TECHNICAL FIELD

The present application relates to a technical field of sealing devices, in particular to a sleeve assembly, a cover plate assembly, a battery, an electricity-consuming apparatus, and a method of sealing a through hole.

BACKGROUND

Lithium-ion battery has extremely high requirements for structural sealing. Lithium-ion battery must not experience electrolyte extravasation during use, otherwise it will pollute the surrounding air and environment; nor must water vapor enter the inner of the battery to react with the electrolyte, which will reduce the battery life. Therefore, after the electrolyte is poured into the secondary battery, in order to ensure the sealing of the battery, it is usually necessary to completely seal the through hole.

In the publication document of Chinese Patent CN106450070B, the sleeve assembly for sealing the through hole includes a sealing sleeve, a nail body arranged in the sealing sleeve, and a nail core arranged in the nail body. In the sealing process, firstly the sealing sleeve is inserted into the liquid injection hole, then the nail barrel is inserted into the sealing sleeve, the nail core needs to be inserted into the nail body, and finally the nail core is pulled and part of the nail core is broken between the nail body and the sealing sleeve so that the sleeve assembly is fixed in the through hole. This sealing manner has a complicated assembly process and low assembly efficiency.

SUMMARY

Embodiments of the present application provide a sleeve assembly, a cover plate assembly, a battery, an electricity-consuming apparatus, and a method for sealing a through hole, and aim to simplify the structure of the sleeve assembly, facilitate the use of the sleeve assembly, and achieve the purpose of simplifying the process of sealing the through hole and improving the efficiency of sealing the through hole.

In one aspect, embodiments of the present application provide a sleeve assembly for sealing a through hole. The sleeve assembly includes a sleeve including a first end and a second end that are opposed to each other, the first end having an opening; and a nail body including a body portion, the radial size of the body portion being larger than the size of the barrel diameter of the sleeve. The body portion is configured to be inserted into the sleeve through the opening and press the inner wall of the sleeve after the sleeve is inserted into the through hole in the axial direction, so as to form a protrusion for riveting the sleeve to the through hole on the outer wall of the sleeve.

According to one aspect of the present application, the thickness of at least part of the side wall of the sleeve close to the opening is smaller than the thickness of the side wall close to the second end. When the nail body presses the inner wall of the sleeve, the amount of deformation of the side wall of the second end is larger, and it is easier to form a protrusion on the side wall of the second end, and the size of the protrusion is larger to ensure that the sleeve can be stably riveted to the through hole.

According to one aspect of the present application, in the direction from the opening to the second end, the inner wall of the sleeve is inclined toward the center of the sleeve. The size of the receiving space is gradually reduced to facilitate the insertion of the body portion into the sleeve. The thickness of the side wall gradually increases, and when the body portion presses the inner wall of the sleeve, a protrusion can be formed at the second end.

According to one aspect of the present application, the outer wall of the sleeve protrudes to form a bulge, and the bulge is used to form the protrusion. When the body portion presses the inner wall of the sleeve, the side wall deforms and the deformation is transmitted to the bulge, so that the bulge can form a protrusion. Since the bulge itself protrudes from the outer wall of the sleeve, the structural strength of the protrusion can be increased, that is, the radial size of the protrusion can be increased, and the stability of the relative position between the sleeve and the through hole can be ensured.

According to one aspect of the present application, the side wall of the sleeve is provided with a slit, and the slit extends from the second end toward the opening. Since the sleeve is provided with a slit, when the body portion of the nail body presses the inner wall of the sleeve, the size of the slit will increase, causing the side wall to turn outward to form a protrusion. The side wall of the sleeve is provided with a slit, which can reduce the possibility of expansion and cracking of the side wall when the protrusion is formed.

According to one aspect of the present application, the second end is closed or open.

In another aspect, the present application also provides a cover plate assembly, including: a plate body having a first surface and a second surface, and a plate body through hole penetrating the first surface and the second surface; and the above-mentioned sleeve assembly used for sealing the plate body through hole. The sleeve assembly can seal the plate body through hole to ensure the airtightness of the plate body through hole.

According to one aspect of the present application, the second end of the sleeve extends from the first surface into the plate body through hole and extends from the second surface out of the plate body through hole, and the protrusion is formed at the second end of the sleeve and abuts against the second surface. The opening of the sleeve is located on the side of the first surface of the plate body, and the second end of the sleeve is located on the side of the second surface of the plate body. The protrusion is formed at the second end and abuts against the second surface. The second surface provides a position limit for the protrusion, thereby preventing the sleeve from separating from the plate body through the plate body through hole.

According to one aspect of the present application, a groove is formed on the hole wall of the plate body through hole, and the protrusion is located in the groove so that the space occupied by the sleeve can be reduced.

According to one aspect of the present application, the groove is exposed on the second surface. The space occupied by the sleeve not only can be reduced, but it is also convenient for the sleeve to be inserted into the plate body through hole, so that the sleeve will not be obstructed in the process of inserting the sleeve into the plate body through hole.

According to one aspect of the present application, the sleeve further includes a side wall and a flange portion connected to the side wall, and the flange portion overlaps the first surface of the plate body, and a gap exists between at least part of the flange portion and the plate body. When the stop end of the nail body presses the flange portion, the deformation of the flange portion can reduce the size of the gap, thereby forming a negative pressure in the gap, which can prevent the stop end from being pushed up by the flange portion and prevent the nail body from separating from the sleeve. At least part of the flange portion overlaps the plate body to form a sealing interface. When the stop end presses the flange portion, the contact area between the flange portion and the plate body can be increased, thereby increasing the area of the sealing interface and improving the sealing effect.

In further another aspect, embodiments of the present application further provide a battery including the above-mentioned cover plate assembly. The electrolyte can be injected into the inner of the battery through the plate body through hole. When the liquid injection is completed, the sleeve assembly can be sealed in the plate body through hole to prevent the electrolyte in the battery from leaking, which can effectively improve the safety performance of the battery.

In still another aspect, embodiments of the present application further provide an electrical device, including the above-mentioned battery.

In yet another aspect, embodiments of the present application further provide a method for sealing a through hole, using the above mentioned sleeve to seal the plate body through hole of the plate body, and the method includes:

Inserting the sleeve into the plate body through hole of the plate body;

Extending the nail body into the sleeve from the opening of the sleeve, so that the nail body presses the inner wall of the sleeve to form a protrusion.

The sealing method is simple and convenient, and can improve the sealing efficiency.

According to an aspect of the present application, the plate body has a first surface and a second surface, wherein in the step of inserting the sleeve into the plate body through hole of the plate body: the sleeve is inserted into the plate body through hole from the first surface, extending out of the second surface of the plate body;

in the step of extending the nail body from the opening of the sleeve into the sleeve, so that the nail body presses the inner wall of the sleeve to form a protrusion: when the nail body is inserted into the sleeve, the nail body presses the sleeve to form a protrusion that abuts against the second surface. The opening of the sleeve is located on the side of the first surface of the plate body, and the second end of the sleeve is located on the side of the second surface of the plate body. The protrusion is formed at the second end and abuts against the second surface. The second surface provides a position limit for the protrusion, thereby preventing the sleeve from separating from the plate body through the plate body through hole.

In the sleeve assembly of the embodiments of the present application, the sleeve assembly is used for sealing the through hole, and the sleeve assembly includes a sleeve and a nail body. The size of the body portion of the nail body is larger than the size of the barrel diameter of the sleeve.

Hence, when the body portion extends into the sleeve from the opening, the inner wall of the sleeve can be pressed. When the sleeve assembly of the embodiments of the present application is used to seal the through hole, the sleeve can be inserted into the through hole firstly, and then the body portion can press the inner wall of the sleeve when the sleeve is inserted through the opening, and a protrusion for riveting the sleeve to the through hole is formed on the outer wall of the sleeve. The sleeve assembly of the embodiments of the present application only needs to use two components of the sleeve and the nail body to seal the through hole, which can simplify the structure of the sleeve assembly and facilitate the use of the sleeve assembly. In addition, when the sleeve assembly of the embodiments of the present application is used to seal the through hole, the sleeve assembly can be riveted to the through hole by only inserting the sleeve into the through hole and inserting the body portion into the sleeve in sequence so as to complete the sealing of the through hole. Therefore, the sleeve assembly of the embodiments of the present application has a simple structure, is convenient to use, can simplify the process of sealing the through hole, and improve the efficiency of sealing the through hole.

BRIEF DESCRIPTION OF THE DRAWINGS

In order to more clearly describe the technical solutions of embodiments of the present application, the following will briefly introduce the drawings that need to be used in embodiments of the present application. Obviously, the following descriptions are only some embodiments of the present application. For those of ordinary skill in the art, other drawings can be obtained from the drawings without inventive work.

DETAILED DESCRIPTION

Figure 1:
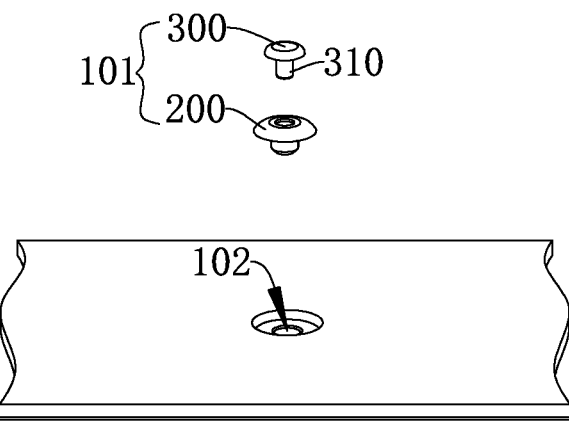
FIG. 1 is a schematic diagram of a structure of a sleeve assembly provided by an embodiment of the present application.

The features and exemplary embodiments of various aspects of the present application will be described in detail below. In the following detailed description, many specific details are proposed in order to provide a comprehensive understanding of the present application. However, it is obvious to the skilled person in the art that the present application can be implemented without some of these specific details. The following description of the embodiments is only to provide a better understanding of the present application by showing examples of the present application. In the drawings and the following description, at least part of the well-known structures and technologies are not shown in order to avoid unnecessary blurring of the present application; and, for clarity, the size of some structures may be exaggerated. In addition, the features, structures or characteristics described below may be combined in one or more embodiments in any suitable manner.

In the description of the present application, it should be noted that, unless otherwise specified, "a plurality of" means two or more; the orientation or positional relationship indicated by the terms "upper", "lower", "left", "right", "inside" and "outside" is only for the convenience of describing the application and simplifying the description, rather than indicating or implying that the device or element referred to must have a specific orientation, be constructed and operated in a specific orientation, and therefore cannot be understood as a limitation of the present application. In addition, the terms "first", "second", etc. are only used for descriptive purposes, and cannot be understood as indicating or implying relative importance.

The orientation words appearing in the following description are all directions shown in the figures, and do not limit the specific structure of the embodiments of the present application. In the description of the present application, it should also be noted that, unless otherwise clearly specified and limited, the terms "installation" and "connection" should be understood in a broad sense, for example, it can be a fixed connection or a detachable connection, or an integral connection; it can be a direct connection or indirect connection. For the skilled person in the art, the specific meaning of the above-mentioned terms in the present application can be understood according to specific circumstances.

In order to better understand the present application, the sleeve assembly, the cover plate assembly, the battery, the electricity-consuming apparatus, and the method for sealing the through hole of the present application will be described in detail below in conjunction with FIGS. 1-29.

Figure 2:
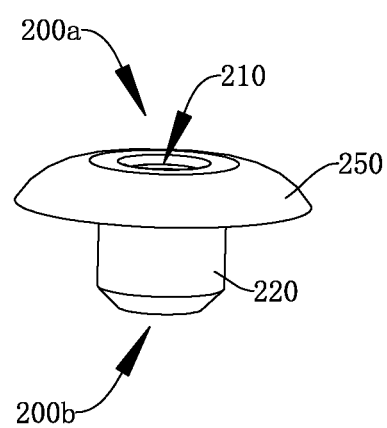
FIG. 2 is a schematic diagram of a structure of a sleeve in a sleeve assembly provided by an embodiment of the present application.
Figure 3:
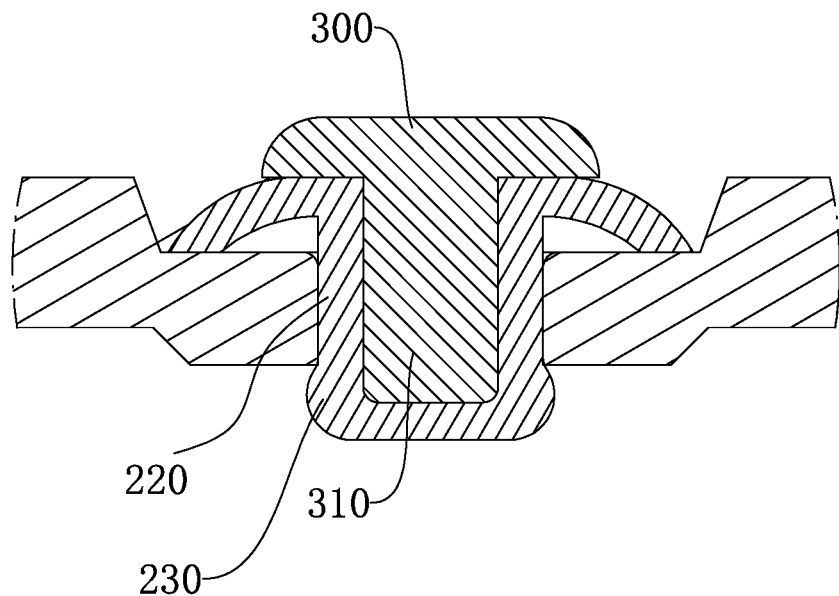
FIG. 3 is a cross-sectional view of a sleeve assembly in use state according to an embodiment of the present application.

Referring to FIGS. 1 to 3, FIG. 1 shows a schematic diagram of an exploded structure of a sleeve assembly 101 provided by an embodiment of the present application, FIG. 2 shows a schematic diagram of a structure of a sleeve 200 provided by an embodiment of the present application and FIG. 3 shows a cross-sectional view of a sleeve assembly 101 in use state according to an embodiment of the present application.

According to the sleeve assembly 101 provided by one aspect of embodiments of the present application, the sleeve assembly 101 is used for sealing the through hole 102. The sleeve assembly 101 includes: a sleeve 200 including a first end 200a and a second end 200b that are arranged oppositely, the first end 200a having an opening 210; and a nail body 300 including a body portion 310, the radial size of the body portion 310 being larger than the size of the barrel diameter of the sleeve 200. The body portion 310 is configured to be inserted into the sleeve 200 through the opening 210 and press the inner wall of the sleeve 200 after the sleeve 200 is inserted into the through hole 102 in the axial direction so as to form a protrusion 230 for riveting the sleeve 200 to the through hole on the outer wall of the sleeve 200.

The sleeve 200 passes through the through hole 102 and extends out of the through hole 102 by a predetermined length. When the body portion 310 is inserted into the sleeve 200, it will press the inner wall of the sleeve 200, and the side wall 220 of the sleeve 200 will deform under the squeezing of the nail body 300 and the inner wall of the through hole 102. Since the part of the sleeve 200 protruding from the through hole 102 has a deformation space correspondingly, a protrusion 230 can be formed on the outer wall of the sleeve 200 so that the sleeve 200 is riveted to the plate 100 where the through hole 102 is located through the protrusion 230.

In the sleeve assembly of the embodiments of the present application, the sleeve assembly 101 is used for sealing the through hole 102, and the sleeve assembly 101 includes a sleeve 200 and a nail body 300. The size of the body portion 310 of the nail body 300 is larger than the size of the barrel diameter of the sleeve 200. Hence, when the body portion 310 extends into the sleeve 200 from the opening 210, the inner wall of the sleeve 200 can be pressed. When the sleeve assembly 101 of the embodiments of the present application is used to seal the through hole 102, the sleeve 200 can be inserted into the through hole 102 firstly, and then the body portion 310 can press the inner wall of the sleeve 200 when the body portion 310 is inserted into the sleeve 200 through the opening 210, and a protrusion 230 for riveting the sleeve 200 to the through hole 102 is formed on the outer wall of the sleeve 200. The sleeve assembly 101 of the embodiments of the present application needs to use only the two components of the sleeve 200 and the nail body 300 to seal the through hole, which can simplify the structure of the sleeve assembly 101 and facilitate the use of the sleeve assembly 101. In addition, when the sleeve assembly 101 of the embodiments of the present application is used to seal the through hole 102, the sleeve 200 is inserted into the through hole 102 and the body portion 310 is inserted into the sleeve 200 in sequence to riveted the sleeve assembly 101 to the through hole 102, thereby completing the sealing of the through hole 102. Therefore, the sleeve assembly 101 of the embodiments of the present application has a simple structure so as to be convenient to use, and can simplify the process of sealing the through hole 102 and improve the efficiency of sealing the through hole 102.

In some embodiments, after the body portion 310 is assembled with the sleeve 200, the diameter of the body portion 310 is the same as the inner diameter of the sleeve 200. For example, the body portion 310 has a cylindrical shape, that is, the body portion 310 has an equal cross-section in the axial direction and has a diameter equal to the inner diameter of the sleeve 200. In this way, the nail body 300 can be inserted into the sleeve 200 with a relatively small force, which facilitates the assembling of the sleeve assembly 101. When the body portion 310 needs to be pulled out, since the body portion 310 is cylindrical, the nail body 300 can be pulled out of the sleeve 200 with a relatively small force.

On the one hand, embodiments of the present application can simplify the process of sealing the through hole 102 and improve the efficiency of sealing the through hole 102. On the other hand, embodiments of the present application are not prone to generate debris during the sealing process, which improves the safety performance of the sealing. On the other hand, the formation of the protrusion 230 can firmly fix the sleeve assembly 101 to the through hole 102, which prevents the sleeve assembly 101 from being separated from the through hole 102 at the time of vibration.

In some embodiments, the second end 200b of the sleeve 200 is closed, and the body portion 310 can abut against the bottom wall of the sleeve 200. The closed second end 200b of the sleeve 200 can also improve the sealing performance of the sleeve assembly 101 and prevent gas or liquid from flowing through the inside of the sleeve 200. The bottom wall of the sleeve 200 refers to a surface of the bottom of the sleeve 200 facing the receiving space 240.

Various materials can be used for the sleeve 200. In some embodiments, the sleeve 200 has elasticity. In some embodiments, the sleeve 200 can be made of rubber material, so that the sleeve 200 has elasticity. The sleeve 200 is prone to deform and forms a protrusion 230 when the nail body 300 presses the sleeve 200. The sleeve 200 can also be made of other elastic materials, as long as the sleeve can form a protrusion 230 when the nail body 300 presses the inner wall of the sleeve 200.

Figure 4:
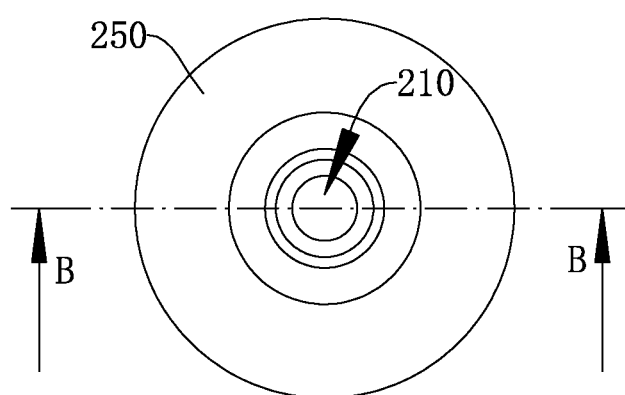
FIG. 4 is a top view of a sleeve in a sleeve assembly provided by an embodiment of the present application.
Figure 5:
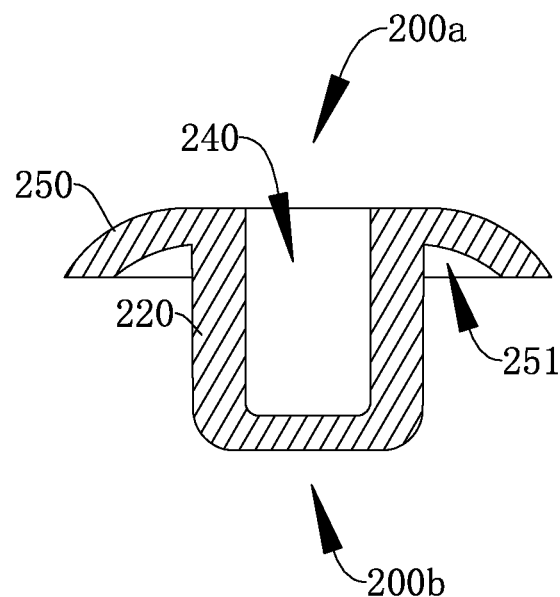
FIG. 5 is a cross-sectional view at B-B in FIG. 4.

Referring to FIGS. 4 and 5 together, FIG. 4 shows a top view of the sleeve 200 in FIG. 2, and FIG. 5 is a cross-sectional view at B-B in FIG. 4. The sleeve 200 is cylindrical and has a side wall 220. The side wall 220 encloses to form a receiving space 240, and the opening 210 of the sleeve 200 is communicated with the receiving space 240, so that the body portion 310 can extend into the receiving space 240 from the opening 210.

The inner wall of the sleeve 200 refers to an inner surface of the side wall 220 of the sleeve 200 facing the receiving space 240. The outer wall of the sleeve 200 refers to an outer surface of the side wall 220 of the sleeve 200 that faces away from the receiving space 240.

As shown in FIG. 5, along the axial direction of the sleeve 200, the side wall 220 of the sleeve 200 is provided with an equal cross section, that is, in the axial direction, the cross-sectional areas of the side wall 220 at different positions are the same, and the thickness of the side wall 220 of the sleeve 200 is uniform. The uniform thickness of the sidewall 220 of the sleeve 200 means that the sidewall 220 is uniform within the error range, without requiring the strict uniformness. The sleeve 200 penetrates through the through hole 102 and extends out of the through hole 102. Since the portion of the sleeve 200 that protrudes from the through hole 102 has a deformation space correspondingly, the body portion 310 presses the inner wall of the sleeve 200 when the body portion 310 extends from the opening 210 into the receiving space 240, the part of the sleeve 200 protruding from the through hole 102 forms a protrusion 230, and the sleeve 200 is riveted to the plate body 100 where the through hole 102 is located through the protrusion 230.

Figure 6:
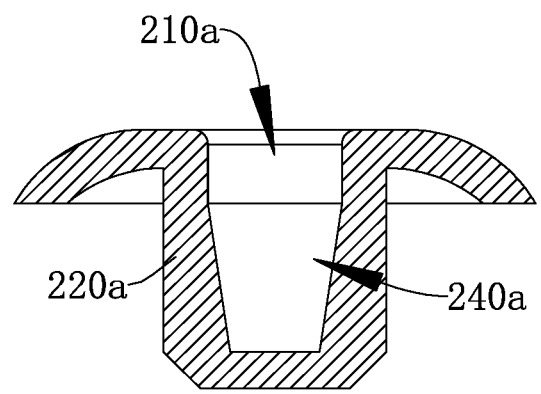
FIG. 6 is a cross-sectional view at B-B in FIG. 4 provided by another embodiment of the present application.

In other embodiments, referring to FIG. 6 together, FIG. 6 shows a schematic diagram of a structure of the sleeve 201 in another embodiment. The sleeve 201 is cylindrical and has a side wall 220a. The side wall 220a encloses and forms a receiving space 240a. The opening 210a of the sleeve 201 is communicated with the receiving space 240a. The thickness of at least part of the side wall 220a of the sleeve 201 close to the opening 210a is smaller than the thickness of the side wall 220a of the second end 200b. That is, along the axial direction of the sleeve 201, the cross-sectional dimensions of the side wall 220a of the sleeve 201 are unequal. The side wall 220a is arranged in a variable cross-sectional manner, and the side wall 220a of the second end 200b of the sleeve 201 is thicker. When the nail body 300 presses the inner wall of the sleeve 201, the side wall 220a of the second end 200b has a larger deformation, and it is easier to form a protrusion 230 on the side wall 220a of the second end 200b, and the size of the protrusion 230 is large to ensure that the sleeve 201 can be riveted to the through hole 102 stably.

Continuing to refer to FIG. 6, in the direction from the opening 210a to the second end 200b, the thickness of the side wall 220a of the sleeve 201 gradually increases. And in the direction from the opening 210a to the second end 200b, the inner wall of the sleeve 201 is inclined toward the center of the sleeve 201. In these embodiments, in the direction from the opening 210a to the second end 200b, the inner wall of the sleeve 201 is inclined, and the size of the receiving space 240a is gradually reduced to facilitate the insertion of the body portion 310 into the sleeve 201. The thickness of the side wall 220a gradually increases. When the body portion 310 presses the inner wall of the sleeve 201, a protrusion 230 can be formed at the second end 200b.

Continuing to refer to FIG. 6, the outer wall of the sleeve 201 is a straight wall, so as to facilitate the insertion of the sleeve 201 into the through hole 102.

It can be understood that, in other embodiments, the inner wall of the sleeve 201 may also have a stepped structure (not shown in the figures), so that the size of the receiving space 240a is large in the top and small in the bottom. When the body portion 310 is inserted into the sleeve 201, the body portion 310 presses the stepped structure of the inner wall of the sleeve 201, and a protrusion 230 is formed on the outer wall of the sleeve 201.

Figure 7:
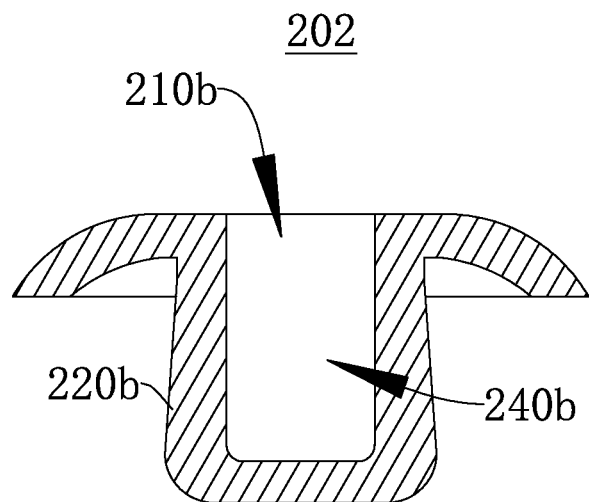
FIG. 7 is a cross-sectional view at B-B in FIG. 4 provided by further another embodiment of the present application.

In other embodiments, referring to FIG. 7 together, the sleeve 202 is cylindrical and has a side wall 220b. The side wall 220b encloses to form a receiving space 240b. The opening 210b of the sleeve 202 communicates with the receiving space 240b. In the direction from the second end 200b to the opening 210b, the outer wall of the side wall 220b is inclined toward the center of the sleeve 202. When the body portion 310 presses the inner wall of the sleeve 202, the outer wall of the other end opposite to the opening 210b deforms more, so that the protrusion 230 formed at the second end 200b has a larger radial size to attain a better fixing effect of the sleeve 202.

Figure 8:
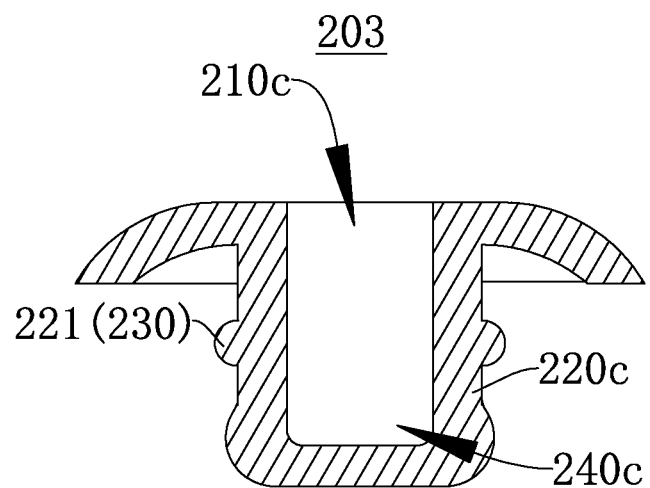
FIG. 8 is a cross-sectional view at B-B in FIG. 4 provided by still another embodiment of the present application.

In some embodiments, referring to FIG. 8 together, the sleeve 203 is cylindrical and has a side wall 220c. The side wall 220c encloses to form a receiving space 240c. The opening 210c of the sleeve 203 is communicated with the receiving space 240c. The outer wall of the side wall 220c protrudes to form a bulge 221. When the body portion 310 presses the inner wall of the sleeve 203, the side wall 220c is deformed, and the deformation is transmitted to the bulge 221, so that the bulge 221 can form a protrusion 230. Since the bulge 221 itself protrudes from the outer wall of the sleeve 203, the structural strength of the protrusion 230 can be increased, that is, the radial size of the protrusion 230 can be increased so that the stability of the relative position between the sleeve 203 and the through hole 102 can be ensured.

Figure 9:
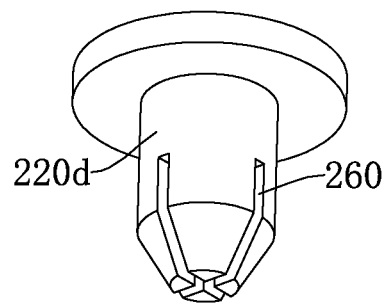
FIG. 9 is a schematic diagram of a three-dimensional structure of a sleeve in a sleeve assembly provided by yet another embodiment of the present application.
Figure 10:
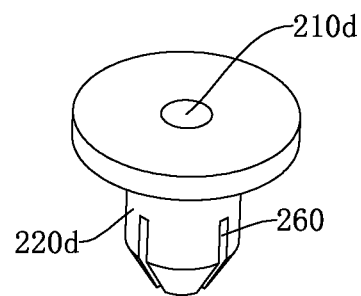
FIG. 10 is a schematic diagram of a structure of a sleeve in a sleeve assembly provided by yet another embodiment of the present application in another perspective.

In further other embodiments, referring to FIGS. 9 and 10 together, FIG. 9 is a schematic diagram of a structure of a sleeve 204 provided by another embodiment of the present application, and FIG. 10 is a schematic diagram of a three-dimensional structure of the sleeve 204 in another perspective. The sleeve 204 has a side wall 220d and an opening 210d. The side wall 220d is provided with a slit 260. The slit 260 extends from the second end 200b of the sleeve 204 toward the opening 210d. In these embodiments, since the sleeve 204 is provided with a slit 260, when the body portion 310 of the nail body 300 presses the inner wall of the sleeve 204, the size of the slit 260 will increase, causing the side wall 220d to turn outward to form a protrusion 230. The side wall 220d of the sleeve 204 is provided with a slit 260, which can reduce the possibility of the side wall 220d from swelling and cracking when the protrusion 230 is formed.

Figure 11:
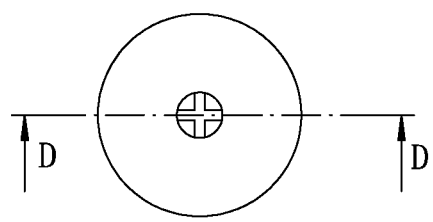
FIG. 11 is a top view of a sleeve in a sleeve assembly provided by yet another embodiment of the present application.
Figure 12:
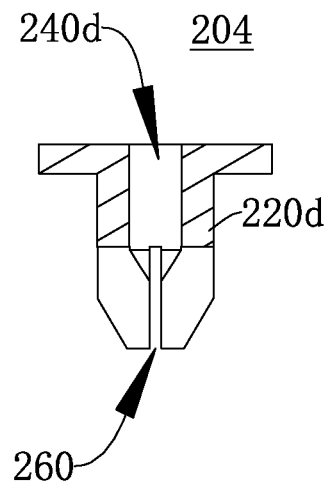
FIG. 12 is a cross-sectional view at D-D in FIG. 11.

Referring to FIGS. 11 and 12 together, FIG. 11 is a top view of the sleeve 204 shown in FIG. 9 and FIG. 12 is a cross-sectional view at D-D in FIG. 11. The sleeve 204 has a receiving space 240d. The slit 260 communicates with the receiving space 240d, that is, the slit 260 penetrates through the side wall 220d of the sleeve 204 so that the sleeve 204 is easily deformed by being pressed. The number of the slit 260 is multiple, and the multiple slits 260 are distributed at intervals along the circumferential direction of the sleeve 204. In some embodiments, a plurality of slits 260 are evenly distributed along the axial direction of the sleeve 204, so that the forced deformation of the sleeve 204 is more uniform.

In the embodiment shown in FIGS. 9 to 12, the second end 200b of the sleeve 204 may be open, that is, both ends of the sleeve 204 are open. When the side wall 220d of the sleeve 204 is provided with a slit 260, the second end 200b of the sleeve 204 opposite to the opening 210d is open, and the slit 260 extends from the second end 200b to the opening 210d. At this time, the size of the protrusion 230 formed by the deformation of the sleeve 204 is relatively large, which can improve the stability of the riveting of the sleeve 204. In some embodiments, the body portion 310 may penetrate through the sleeve 204 so that the sleeve 204 is more fully deformed. The protrusion 230 formed by the deformation of the sleeve 204 has a larger size, which ensures the stability of the riveting of the sleeve 204.

Various materials can be used for the nail body 300. In some embodiments, the nail body 300 can be made of a rigid material, and the material of the nail body 300 includes, for example, rigid plastic, steel, aluminum, and the like. The structure of the nail body 300 is relatively hard, and the nail body 300 is not easily deformed when the nail body 300 presses the inner wall of the sleeve 200.

Figure 13:
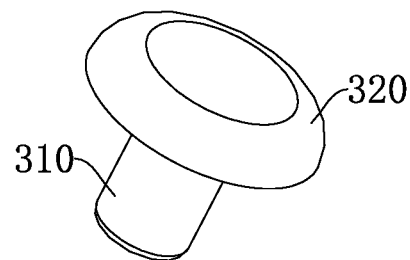
FIG. 13 is a schematic diagram of a structure of a nail body in a sleeve assembly provided by an embodiment of the present application.
Figure 14:
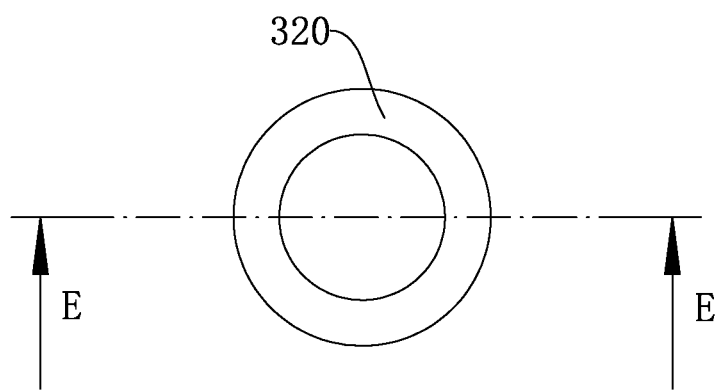
FIG. 14 is a top view of a nail body in a sleeve assembly provided by an embodiment of the application.
Figure 15:
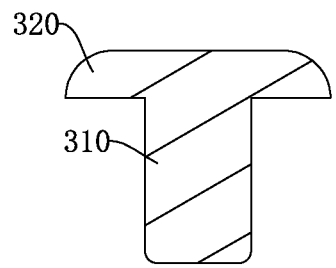
FIG. 15 is a cross-sectional view at E-E in FIG. 14.

In some embodiments, continuing to refer to FIG. 2, the sleeve 200 includes a flange portion 250 connected to the side wall 220. Referring to FIGS. 13 to 15 together, FIGS. 13 to 15 show a schematic diagram of a structure of the nail body 300. The nail body 300 further includes a stop end 320 connected to one end of the body portion 310. The stop end 320 is used to press the flange portion 250 when the body portion 310 is inserted into the sleeve 200.

Figure 16:
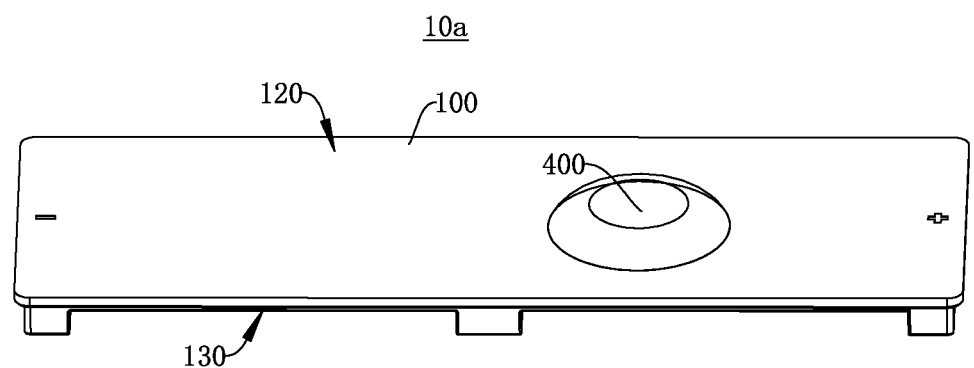
FIG. 16 is a schematic diagram of a structure of a cover plate assembly provided by an embodiment of the present application.
Figure 17:
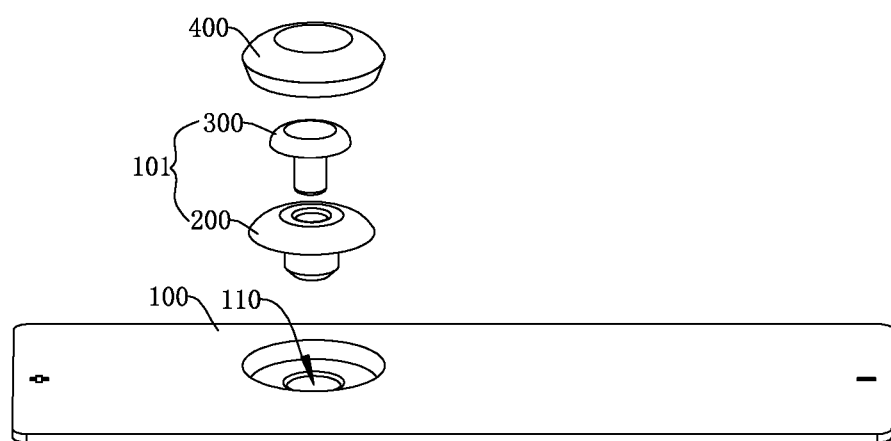
FIG. 17 is a schematic diagram of an exploded structure of a cover plate assembly provided by an embodiment of the application.

Referring to FIGS. 16 and 17 together, FIG. 16 shows a schematic diagram of a structure of a cover plate assembly provided by an embodiment of the present application, and FIG. 17 is a schematic diagram of the exploded structure of FIG. 16. According to the cover plate assembly 10a provided in another aspect of the present application, the cover plate assembly 10a includes a plate body 100 having a first surface 120 and a second surface 130, and a plate body through hole 110 penetrating the first surface 120 and the second surface 130; and the above-mentioned sleeve assembly 101, the sleeve assembly 101 is used for sealing the plate body through hole 110. The sleeve assembly 101 includes a sleeve 200 and a nail body 300.

In these embodiments, the sleeve assembly 101 can seal the plate body through hole 110 to ensure the tightness of the plate body through hole 110.

Figure 18:
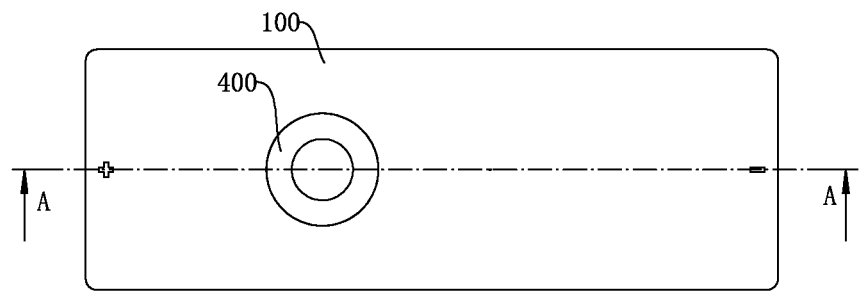
FIG. 18 is a top view of a cover plate assembly provided by an embodiment of the application.
Figure 19:
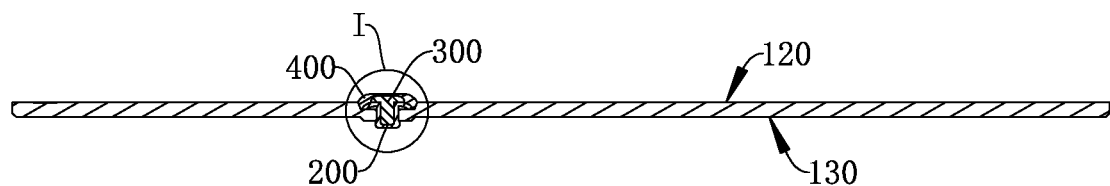
FIG. 19 is a cross-sectional view at A-A in FIG. 18.
Figure 20:
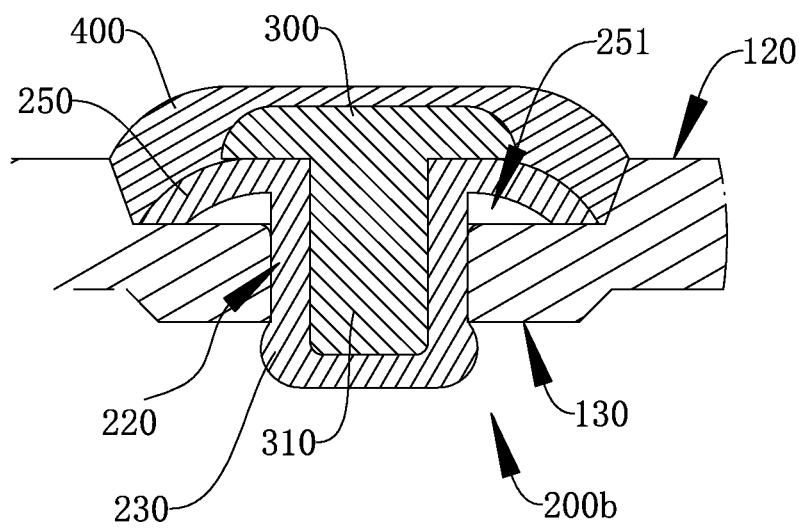
FIG. 20 is a schematic diagram of a partial enlarged structure at I in FIG. 19.

Referring to FIGS. 18 to 20 together, FIG. 18 is a top view of the cover plate assembly in FIG. 16, FIG. 19 is a cross-sectional view at A-A in FIG. 18, and FIG. 20 is a schematic diagram of a partial enlarged structure at I in FIG. 19. In some embodiments, the other end of the sleeve 200 opposite to the opening 210 extends from the first surface 120 into the plate body through hole 110, and from the second surface 130 out of the plate body through hole 110. The protrusion 230 is formed in the second end 200b of the sleeve 200 and abuts against the second surface 130.

In these embodiments, the opening 210 of the sleeve 200 is located on the side of the first surface 120 of the plate body 100, and the second end 200b of the sleeve 200 is located on the side of the second surface 130 of the plate body 100. The protrusion 230 is formed at the second end 200 b and abuts against the second surface 130. The second surface 130 provides a position limit to the protrusion 230 to prevent the sleeve 200 from separating from the plate body 100 through the plate body through hole 110.

Figure 21:
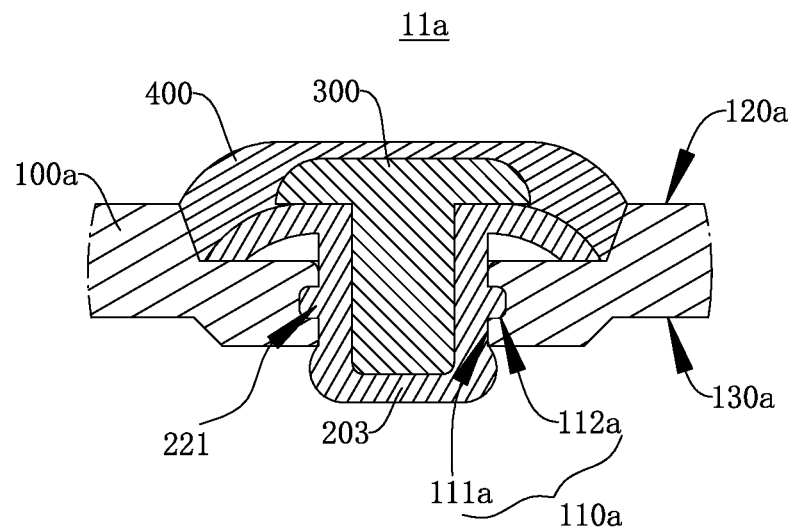
FIG. 21 is a schematic diagram of a partial enlarged structure at I in FIG. 19 provided by another embodiment of the present application.

Referring to FIG. 21 together, in other embodiments, the cover plate assembly 11a includes a plate body 100a and a through hole 110a penetrating the plate body 100a. A bulge 221 is formed on the outer wall of the sleeve 203, and a groove 112a is formed on the hole wall 111a of the plate body through hole 110. The bulge 221 is located in the groove 112a to form a protrusion 230 for riveting the sleeve 203 to the plate body 100a. In these embodiments, the protrusion 230 is formed in the groove 112a on the hole wall 111a, which can reduce the space occupied by the sleeve 203.

The location of the groove 112a is not limited, and the groove 112a may be located between the first surface 120a and the second surface 130a.

Figure 22:
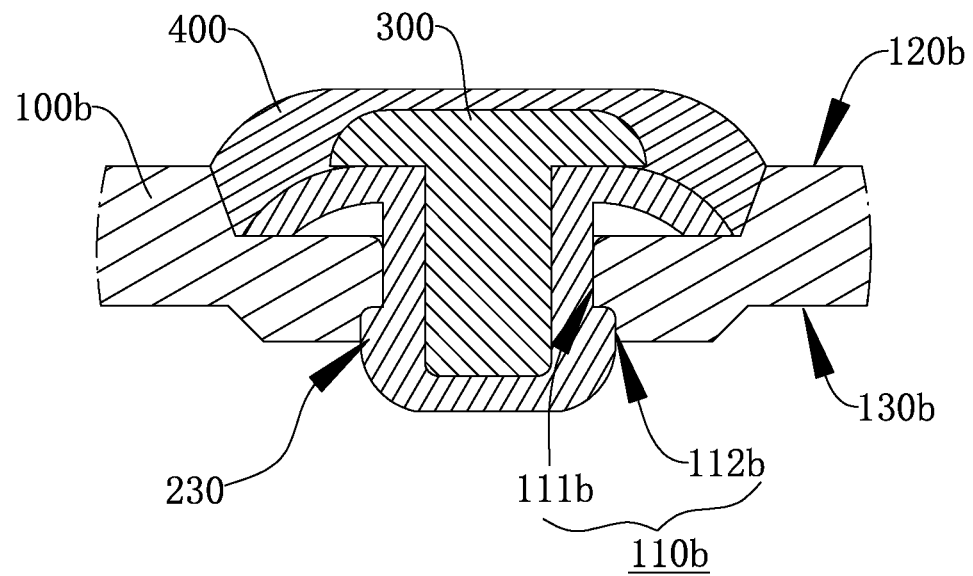
FIG. 22 is a schematic diagram of a partial enlarged structure at I in FIG. 19 provided by further another embodiment of the present application.

Or, referring to FIG. 22 together, the plate body 100b has a first surface 120b, a second surface 130b, and a plate body through hole 110b penetrating therethrough. A groove 112b is formed on the hole wall 111b of the plate body through hole 110b. The groove 112b is exposed on the second surface 130b, which not only reduces the space occupied by the sleeve 200, but also facilitates the insertion of the sleeve 200 into the plate body through hole 110b, so that the sleeve 200 will not be obstructed during the sleeve 200 is inserted into the plate body through hole 110b.

Figure 23:
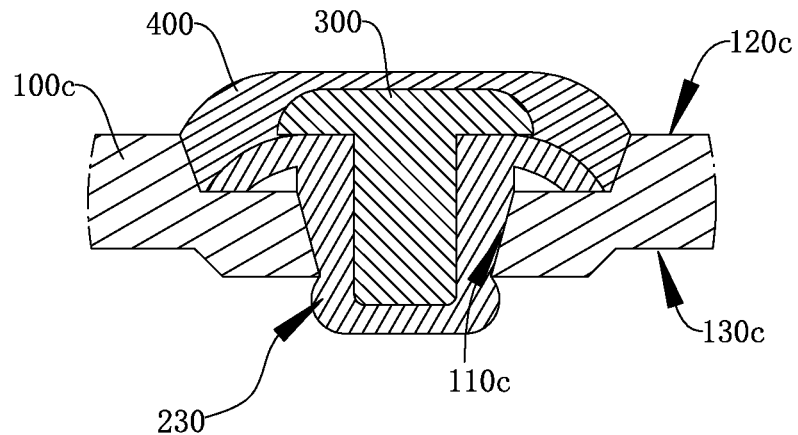
FIG. 23 is a schematic diagram of a partial enlarged structure at I in FIG. 19 provided by still another embodiment of the present application.

Referring to FIG. 23 together, in further other embodiments, the plate body 100c has a plate body through hole 110c. In the direction from the first surface 120c to the second surface 130c, the hole diameter of the plate body through hole 110c gradually decreases. In these embodiments, when the sleeve 200 is inserted into the plate body through hole 110c, the second end 200b of the sleeve 200 corresponds to the position with the smaller hole diameter of the plate body through hole 110c, and thus the amount of deformation of the second end 200b of the sleeve 200 is greater, so that the protrusion 230 can be formed and the sleeve 200 can be stably riveted into the plate body through hole 110c.

The number of the protrusion 230 is not limited. Only one protrusion 230 can be provided. For example, the sleeve 200 penetrates through the plate body through hole 110 and extends from the second surface 130 to form a protrusion 230 that abuts against the second surface 130. Alternatively, the hole wall 111b is provided with a groove 112b, and the sleeve 200 is located in the plate body through hole 110b to form a protrusion 230 in the groove 112b (for example, see the protrusion 230 formed by the bulge 221 in FIG. 8). Or, in further other embodiments, two protrusions 230 are generated when the sleeve 200 and the plate body 100 are engaged with each other, and the sleeve 200 penetrates the plate body through hole 110 and protrudes from the second surface 130 to form a first protrusion 230 that abuts against the second surface 130; and a groove 112b is formed on the hole wall 111b of the plate body through hole 110, and a second protrusion 230 is formed in the groove 112b (for example, see the protrusion 230 formed by the bulge 221 in FIG. 8).

Figure 24:
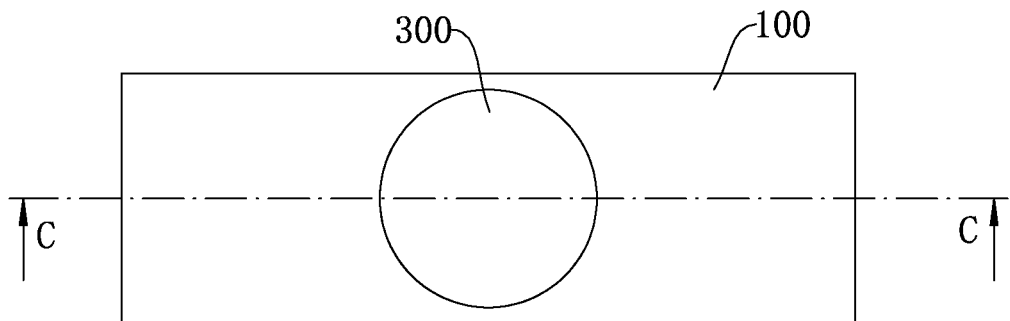
FIG. 24 is a top view of a cover plate assembly provided by yet another embodiment of the present application.
Figure 25:
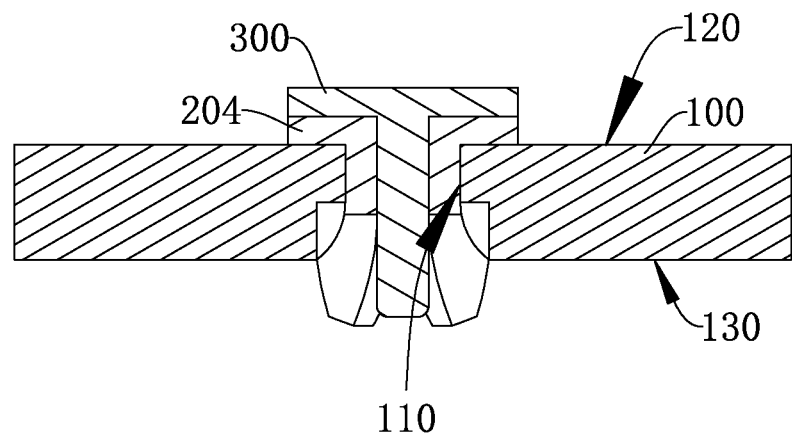
FIG. 25 is a cross-sectional view at C-C in FIG. 24.

Referring to FIGS. 24 and 25 together, when the side wall 220d of the sleeve 204 is provided with a slit 260 (see FIGS. 9 and 10), and the sleeve 204 is used to seal the plate body through hole 110 on the plate body 100, the sleeve 204 enters the plate body through hole 110 from the first surface 120, and the sleeve 204 extends from the second surface 130. The slit 260 is located on the lower side of the second surface 130 as shown in FIG. 25, which can avoid the slit 260 from influencing the sealing performance of the sleeve 200.

In some embodiments, continuing to refer to FIG. 20, the sleeve 200 further includes a side wall 220 and a flange portion 250 connected to the side wall 220. At least part of the flange portion 250 overlaps the first surface 120 of the plate body 100. There is a gap 251 between the flange portion 250 and the plate body 100.

In these embodiments, there is a gap 251 between at least part of the flange portion 250 and the plate body 100. When the stop end 320 of the nail body 300 presses the flange portion 250, the deformation of the flange portion 250 can reduce the size of the gap 251 and a negative pressure is formed in the gap 251, which can prevent the stop end 320 from being pushed up by the flange portion 250 and prevent the nail body 300 from being separated from the sleeve 200. At least part of the flange portion 250 overlaps the plate body 100 to form a sealing interface. When the stop end 320 presses the flange portion 250, the contact area between the flange portion 250 and the plate body 100 can be increased, the area of the sealing interface can be increased and the sealing effect is improved.

The shape of the flange portion 250 can be designed in many ways, and the longitudinal section of the flange portion 250 may be stepped.

Or, in some other embodiments, the flange portion 250 has an umbrella-like shape, and the longitudinal section of the flange portion 250 is arc-shaped and protrudes in a direction away from the plate body 100. In these embodiments, the flange portion 250 has an umbrella-like shape. When the nail body 300 applies a pressing force to the flange portion 250, the flange portion 250 deforms more easily.

Next, the application of the cover plate assembly 10a in the battery will be introduced in conjunction with FIGS. 26 to 30. As shown in FIGS. 26 to 30, embodiments of the present application further provide a battery including the above-mentioned cover plate assembly 10a. The battery may be any of a battery pack, a battery module, or a battery cell.

Figure 26:
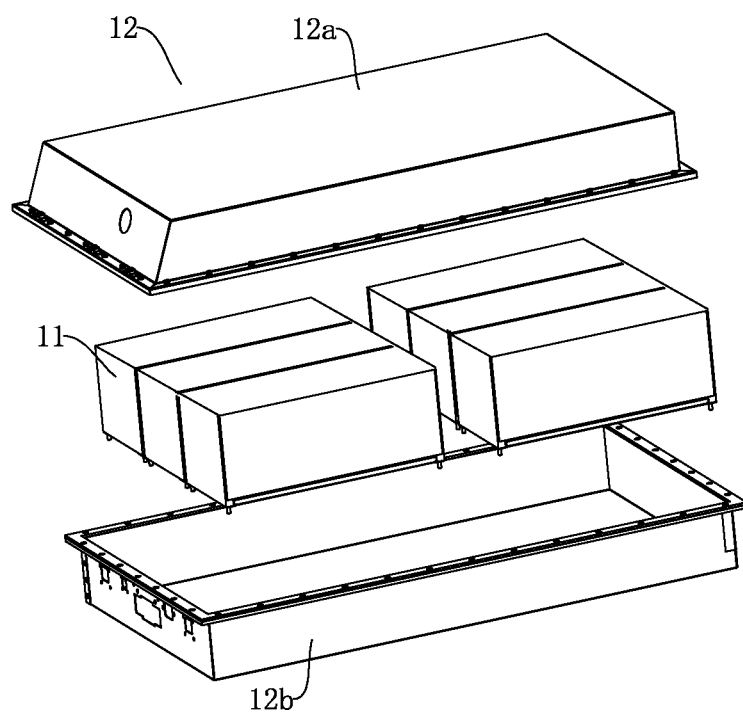
FIG. 26 is a schematic diagram of a structure of a battery provided by an embodiment of the present application.
Figure 27:
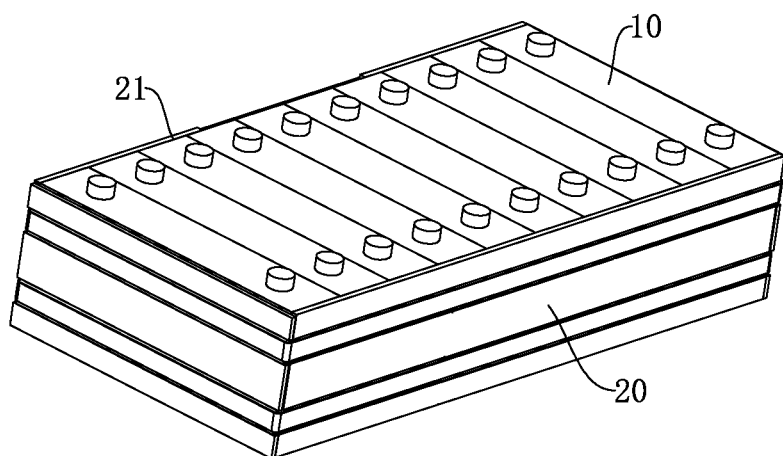
FIG. 27 is a schematic diagram of a structure of a battery provided by another embodiment of the present application.

Continuing to refer to FIGS. 26 and 27, in some embodiments, the battery is a battery pack, and the battery pack 1 includes a case 12 and a battery module 11 or a battery cell 10 disposed in the case 12.

The case 12 includes a first case body 12a and a second case body 12b. The first case body 12a and the second case body 12b are buckled together so that a closed space is formed inside the case 12 to accommodate the battery module 11 and the like. The "closed space" here refers to a covered or enclosed space, which may be sealed or unsealed.

The battery module 11 contained in the case 12 includes a plurality of battery cells 10. The number of battery module 11 is not limited to one, and may be two or more. For example, a plurality of battery modules 11 are housed in the case 12, and different battery modules 11 are electrically connected through connectors, so as to attain serial and parallel connection between the battery modules 11.

Alternatively the battery cell 10 is directly placed in the case 12 of the battery pack 1. The number of the battery cell 10 is not limited to one, and may be two or more. For example, a plurality of battery cells 10 are housed in a case 12, and different battery cells 10 are electrically connected by a bus bar, so as to attain a series and parallel connection between the battery cells 10.

In some embodiments, the battery pack 1 may be an energy storage device such as an energy storage cabinet (not shown in the figures), and in this case, the case 12 may be provided with a door.

Referring to FIG. 27, in some embodiments, the battery is the battery module 11. The battery module 11 includes a frame 20 and a battery cell 10 located in the frame 20.

In some embodiments, the frame 20 is enclosed and formed by side plates 21 that are connected end to end in sequence, and the battery cell 10 is accommodated in the frame 20.

Figure 28:
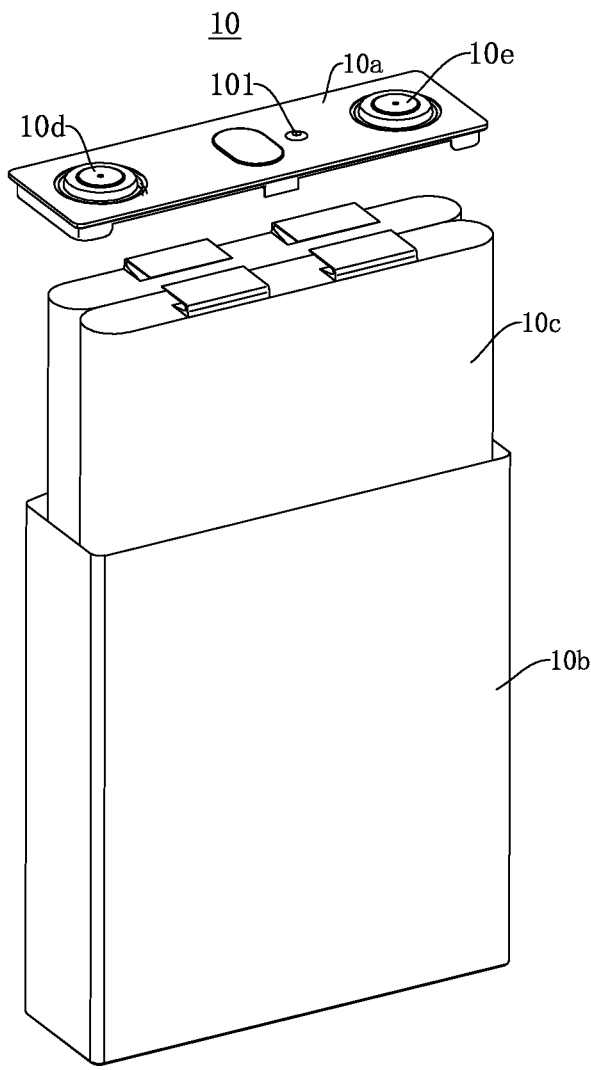
FIG. 28 is a schematic diagram of a structure of a battery provided by another embodiment of the present application.

Continuing to refer to FIG. 28, in some embodiments, the battery is a battery cell 10. The battery cell 10 includes a housing 10b, an electrode assembly 10c located in the housing 10b, and a cover plate assembly 10a provided at the opening of the housing 10b. The electrode assembly 10c can be formed by winding or laminating a first pole piece (not shown in the figures), a separator (not shown in the figures), and a second pole piece (not shown in the figures) together, wherein the first pole piece and the second pole piece have opposite polarities, and the diaphragm is an insulator between the first pole piece and the second pole piece.

In some embodiments, when the cover plate assembly 10a is used for a battery cell, the cover plate assembly 10a further includes a first electrode terminal 10d and a second electrode terminal 10e. The first electrode terminal 10d and the second electrode terminal 10e have opposite polarities and are used for leading out electrical energy.

When the cover plate assembly 10a is used in a battery, the plate body through hole 110 can be used as a liquid injection hole (not shown in the figures), so that the electrolyte can be injected into the inner of the battery through the plate body through hole 110. When the liquid injection is completed, the sleeve assembly 101 can be sealed in the plate body through hole 110 to prevent the electrolyte in the battery from leaking, which can effectively improve the safety performance of the battery.

When the sleeve assembly 101 of the embodiments of the present application is used to seal the plate body through hole 110, that is, to use the sleeve assembly 101 of the embodiments of the present application to seal the liquid injection hole of the battery only needs to insert the sleeve 200 into the injection hole and insert the nail body 300 into the sleeve 200 to form a protrusion 230 in sequence, and the sleeve assembly 101 can be riveted and sealed in the liquid injection hole. The process of sealing the liquid injection hole can be simplified, the efficiency of sealing the liquid injection hole can be improved, and the efficiency of assembling the battery can be improved.

In addition, when gas is generated inside the battery after the battery is used for a period of time, the nail body 300 can be directly pulled out of the sleeve 200 to facilitate the exhaust of the battery. Or, when the electrolyte is consumed and needs to be refilled after the battery is used for a period of time, the nail body 300 can also be pulled out of the sleeve 200, the sleeve 200 can be pulled out of the liquid injection hole and a second injection is performed through the liquid injection hole. After the liquid injection is completed, the sleeve assembly 101 can be assembled into the liquid injection hole again in sequence in order to complete the sealing of the liquid injection hole.

In some embodiments, the cover plate assembly 10a further includes a sealant 400 that covers the nail body 300 and is used for bonding the nail body 300 and the sleeve 200 to the plate body 100. The sealant 400 can not only ensure the relative stability between the sleeve assembly 101 and the plate body 100, but also provide a secondary sealing effect. In some embodiments, the sealant 400 may use a dissolvable material. When the battery cell 10 needs to be injected for a second time, the sealant 400 is dissolved, and the sleeve assembly 101 is removed from the plate body through hole 110, and the battery cell 10 can be injected through the plate body through hole 110 for a second time. When the battery cell 10 needs to be sealed after the liquid injection is completed, the sleeve assembly 101 can be installed in the plate body through hole 110, and then the sealant 400 is disposed on the nail body 300, and the sleeve assembly 101 is fixed on the plate body 100 by the sealant 400. The stability of the relative position between the sleeve assembly 101 and the plate body 100 can be improved, and the sleeve assembly 101 can be prevented from loosening during the use of the battery cell 10.

It can be understood that the cover plate assembly 10a can not only be used for covering the housing 10b of the battery cell 10, but the cover plate assembly 10a can also be used as a cover for other devices, as long as the other device has an opening adapted with the size of the cover plate assembly 10a.

Figure 29:
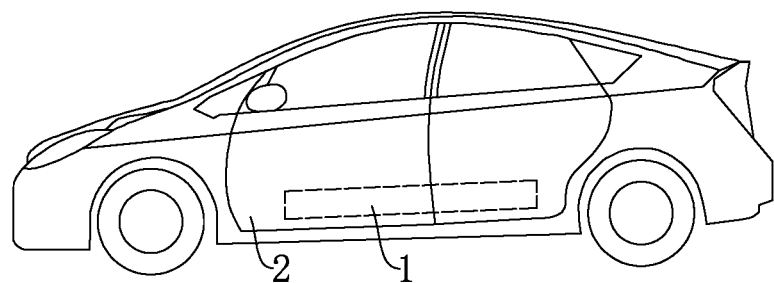
FIG. 29 is a schematic diagram of a structure of an electricity-consuming apparatus provided by an embodiment of the present application.

Referring to FIG. 29, FIG. 29 shows a schematic diagram of a structure of an electricity-consuming apparatus provided by an embodiment of the present application. The electricity-consuming apparatus includes the above-mentioned battery. The battery is, for example, provided on the device body of the electricity-consuming apparatus to provide electrical energy.

In some embodiments, the electricity-consuming apparatus is a mobile device such as a vehicle, a ship, a small aircraft, etc., which includes a power source, and the power source includes a battery. The electrical energy provided by the battery provides a driving force for the electricity-consuming apparatus. In some embodiments, the driving force of the electricity-consuming apparatus is all electric energy, and in this case, the power source only includes a battery. In other embodiments, the driving force of the electricity-consuming apparatus includes electric energy and other energy sources (for example, mechanical energy), and the power source includes battery and other power equipment such as an engine. Referring to FIG. 29, a vehicle is taken as an example, in some embodiments, the electrical device is a new energy vehicle. The new energy vehicle may be a pure electric vehicle, a hybrid electric vehicle, an extended-range vehicle, an electric tricycle, or a two-wheel electric vehicle. The vehicle includes a vehicle body 2 and a battery pack 1.

Figure 30:
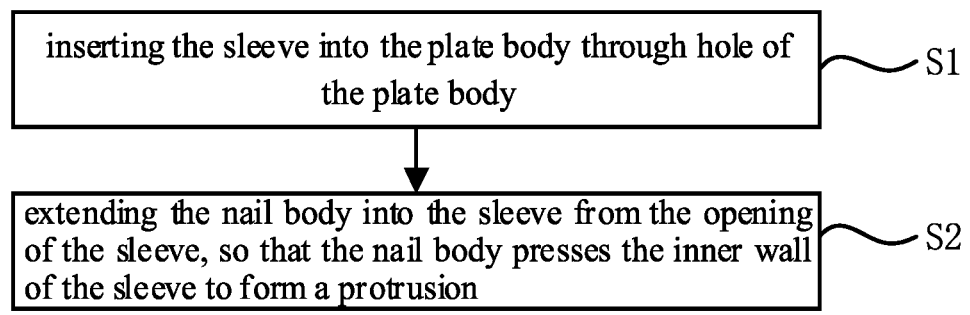
FIG. 30 is a schematic flow chart of a method for sealing a through hole according to an embodiment of the present application.

Referring to FIG. 30, embodiments of the present application further provide a method for sealing a through hole by using the above-mentioned sleeve assembly 101 to seal the plate body through hole 110 of the plate body 100, the method including:

Step S1: inserting the sleeve 200 into the plate body through hole 110 of the plate 100;

Step S2: extending the nail body 300 into the sleeve 200 from the opening 210 of the sleeve 200, so that the nail body 300 presses the inner wall of the sleeve 200 to form a protrusion 230.

In some embodiments, in step S1, the sleeve 200 is inserted into the plate body through hole 110, and the sleeve 200 is extended out of the second surface 130 of the plate 100. In step S2, when the nail body 300 is extended into the sleeve 200, the nail body 300 presses the inner wall of the sleeve 200 to form a protrusion 230, and the protrusion 230 abuts against the second surface 130.

The present application can be implemented in other specific forms without departing from its spirit and essential characteristics. For example, the algorithm described in the specific embodiment can be modified, and the system architecture does not deviate from the basic spirit of the application. Therefore, the current embodiments are regarded as illustrative rather than restrictive in all aspects, and the scope of the present application is defined by the appended claims rather than the foregoing description, and falls within the meaning and equivalents of the claims. All changes within the scope are thus included in the scope of this application.

What is claimed is:
1. A cover plate assembly, comprising
   a plate body comprising a first surface and a second surface, and a through hole penetrating the first surface and the second surface; and
   a sleeve assembly for sealing the through hole, comprising:

a sleeve comprising a first end and a second end that are opposed to each other, the first end comprising an opening;

a nail body comprising a body portion, wherein a radial size of the body portion is larger than a size of a barrel diameter of the sleeve, so that after the sleeve is inserted into the through hole in a axial direction, the body portion can be inserted into the sleeve from the opening and press an inner wall of the sleeve to form a protrusion for riveting the sleeve to the through hole on an outer wall of the sleeve, wherein the sleeve further comprises a side wall and a flange portion connected to the side wall, and when the sleeve is in the through hole and the nail body is in the sleeve, an outer edge of the flange portion contacts the first surface of the plate body to form a sealing interface, so that a gap is formed between the flange portion and the first surface of the plate body.

2. The cover plate assembly of claim 1, wherein a thickness of at least part of a side wall of the sleeve close to the opening is smaller than a thickness of the side wall close to the second end when the sleeve, the nail body and the through hole are all separate from each other.

3. The cover plate assembly according to claim 1, wherein in a direction from the opening to the second end, the inner wall of the sleeve is inclined toward a center of the sleeve when the sleeve, the nail body and the through hole are all separate from each other.

4. The cover plate assembly according to claim 1, wherein when the sleeve, the nail body and the through hole are all separate from each other, the outer wall of the sleeve is provided with a bulge, and the bulge is used to form the protrusion.

5. The cover plate assembly according to claim 1, wherein a side wall of the sleeve is provided with a slit, and the slit extends from the second end toward the opening.

6. The cover plate assembly according to claim 5, wherein the second end is open.

7. The cover plate assembly according to claim 1, wherein the second end is closed.

8. The cover plate assembly according to claim 1, wherein the sleeve is in the through hole and the nail body is in the sleeve by the second end of the sleeve extends from the first surface into the through hole, and extends from the second surface out of the through hole, and the protrusion is formed at the second end of the sleeve and abuts against the second surface.

9. The cover plate assembly according to claim 1, wherein
a groove is formed on a hole wall of the through hole, and
the protrusion is located in the groove.

10. The cover plate assembly of claim 9, wherein the groove is exposed to the second surface.

11. A battery comprising the cover plate assembly according to claim 1.

12. An electricity-consuming apparatus comprising the battery according to claim 11.

13. The cover plate assembly according to claim 1, wherein the second end is open.

14. The cover plate assembly according to claim 1, wherein the nail body further comprises a stop end connected to one end of the body portion and is configured to press the flange portion when the body portion is inserted into the sleeve.

* * * * *